United States Patent [19]
Chong et al.

[11] Patent Number: 5,317,247
[45] Date of Patent: May 31, 1994

[54] INTEGRATED BATTERY CONTACT AND RETENTIVE PROTRUSION

[75] Inventors: Kok H. Chong, Tamarac; Steven J. Finch, Sunrise; Robert Leon, Miami Lakes, all of Fla.

[73] Assignee: Motorola, Inc., Schaumburg, Ill.

[21] Appl. No.: 49,060

[22] Filed: Apr. 19, 1993

[51] Int. Cl.⁵ ............................................. A02J 7/00
[52] U.S. Cl. .................................... 320/2; 455/8332 3
[58] Field of Search ...................... 320/2; 455/89, 90; 429/96, 97, 98, 99, 100

[56] References Cited

U.S. PATENT DOCUMENTS

| | | | |
|---|---|---|---|
| 3,728,664 | 4/1973 | Hurst . | |
| 3,757,194 | 9/1973 | Weber et al. | 320/2 |
| 4,578,628 | 3/1986 | Siwiak | 320/2 |
| 4,616,169 | 10/1986 | Proffitt | 320/2 |
| 4,709,201 | 11/1987 | Schaefer et al. | 320/2 |
| 4,714,439 | 12/1987 | Marabotto et al. | 439/627 |
| 4,829,591 | 5/1989 | Hashimoto et al. | 455/89 |
| 5,136,229 | 8/1992 | Galvin | 320/2 |
| 5,160,879 | 11/1992 | Tortola et al. | 320/2 |
| 5,251,105 | 10/1993 | Kobayashi et al. | 320/2 |
| 5,251,329 | 10/1993 | Takogi et al. | 455/89 |
| 5,256,955 | 10/1993 | Tomura et al. | 320/2 |

OTHER PUBLICATIONS

07/664,240, Mennona, 455/90, Mar. 4, 1991.
07/848,593, Karl et al., 455/347, Mar. 9, 1992.

*Primary Examiner*—Kristine L. Peckman
*Attorney, Agent, or Firm*—Kenneth M. Massaroni

[57] ABSTRACT

A battery (10) includes at least one cell (71) which is contained in a housing (16). Mating mechanisms, located on the housing, selectively attaches the battery to the radio. The mating mechanisms include a protrusion (36) selectively receivable (64) by the radio. At least one electrical contact (18) is located on the protrusion (36).

5 Claims, 2 Drawing Sheets

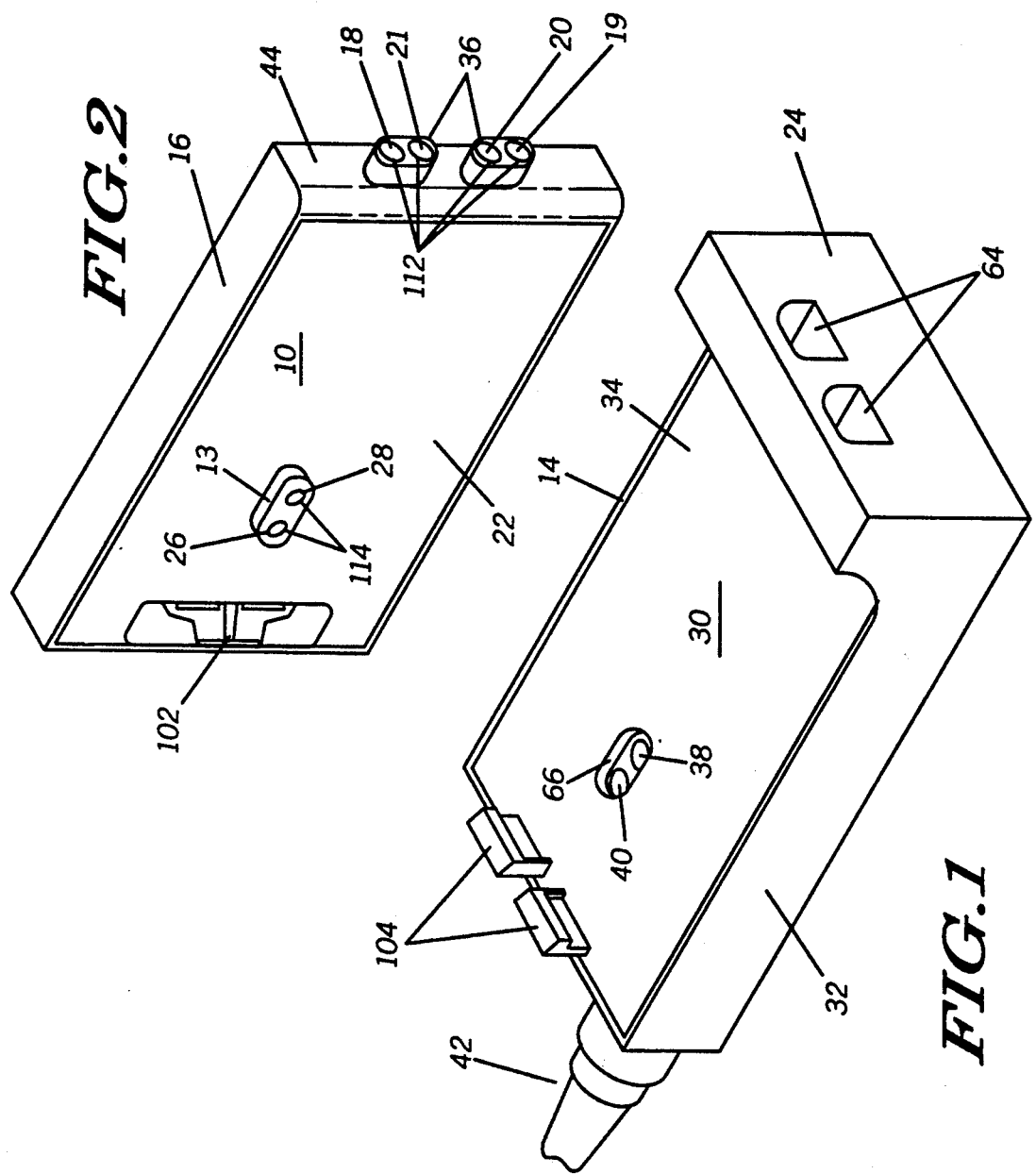

INTEGRATED BATTERY CONTACT AND RETENTIVE PROTRUSION

TECHNICAL FIELD

This invention relates generally to battery contacts and mechanical mating means and more specifically to a battery contact that is retained in the mechanical mating means.

BACKGROUND

Electronic portable products typically have battery packs having both supply contacts and charger contacts. In addition, the battery packs have a means of attaching themselves to the portable electronic products. Conventionally, contacts to the portable electronic product and the attachment means to the electronic product have been two separate and distinct mechanisms having two separate purposes. Having separate supply or battery contacts and attachment means (on the battery) to the portable product or charger, respectively, requires additional parts and tooling to manufacture the battery pack. Furthermore, in manufacturing different capacities or sizes of battery packs, separate designs and tooling would be required for the supply contacts and the charger contacts. Thus, having separate battery contacts that are either for charging or supply and separate battery mating mechanisms on a battery for a portable electronic product creates a redundancy in parts, tooling, and a decrease in manufacturing efficiency. In other words, an increased number of parts and tooling processes raise the cost of the battery. Finally, separate battery contacts and attachment mechanisms increase the concern of wear, fatigue and corrosion in each of those parts.

SUMMARY OF THE INVENTION

A battery includes at least one cell which is contained in a housing. Mating mechanisms, located on the housing, selectively attaches the battery to the radio. The mating mechanisms include a protrusion selectively receivable by the radio. At least one electrical contact is located on the protrusion.

DESCRIPTION OF THE DRAWINGS

FIG. 1 is a perspective rear view of an electronic product in accordance with the present invention.

FIG. 2 is a perspective rear view of a battery pack in accordance with the present invention.

DETAILED DESCRIPTION OF THE PREFERRED EMBODIMENT

Figure 3:
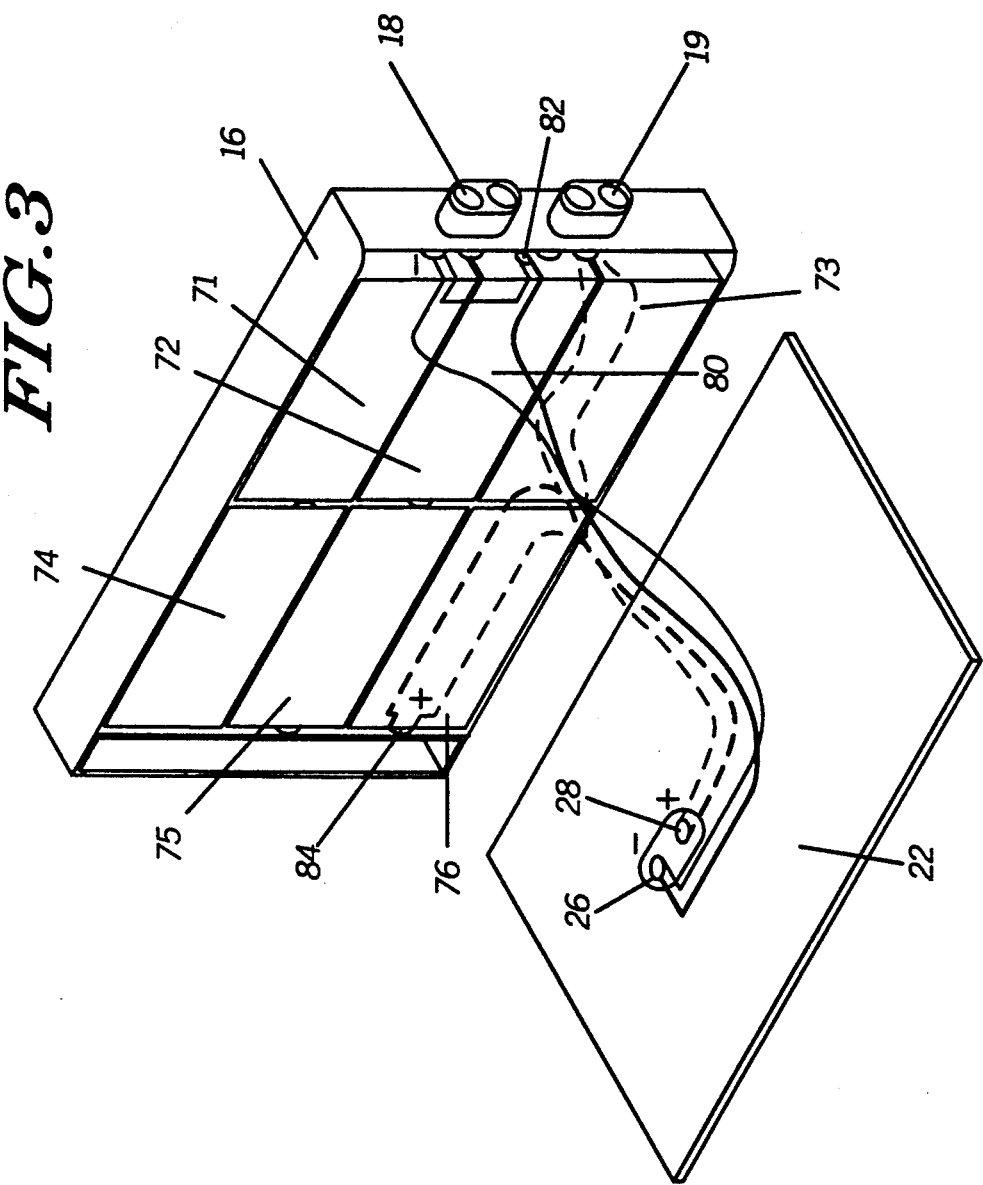
FIG. 3 is a perspective internal view of the cell compartment portion of the battery pack of FIG. 2.

Referring to FIG. 1, a battery (or other energy source) or battery pack 10 attaches to one or more electronic products. Specifically, the battery pack 10 attaches to and supplies battery current to power a communication device, such as a two-way radio 30 in FIG. 1. Radio 30 includes a radio housing 32 having a battery receiving area 34 on the backside 14 of the radio housing and an antenna 42. The receiving area 34 also includes a bottom sidewall 24 that extends perpendicularly away from the backside 14 of the housing 32. Within the battery receiving area 34, the radio 30 has retainable receiving areas, such as a cavity 66 located on the backside 14 and a pair of apertures 64, located on the bottom sidewall 24 to form a retainer, for mechanically coupling the battery 10 to the radio 30. Conductive mating means, such as positive and negative radio supply contacts 38 and 40, respectively are recessed within the cavity 66, but show through corresponding apertures, to form a protrusion receiving area or socket. The bottom apertures 64 and the top cavity 66 are used for receiving the battery 10. These retainers simultaneously serve three functions: mechanically coupling the battery 10 to the radio 30, electronically coupling the battery to the radio via the radio contacts 40 and 38, and providing accessibility to the battery for a second electronic product, such as a charger (not shown) via the apertures 64 when charging the battery.

Optionally, for further mechanical locking of the battery to the radio, the top of the battery pack also includes a releasable snap feature 102 for latching with the catch assembly 104 of the radio's backside 14. The radio housing 32 and its backside 14 can either be two separate housings coupled together or one integrated housing. Preferably, the backside of the radio housing is a separate metal chassis for providing ground protection to the radio while both the housings for the battery and radio are made from plastic.

Referring to FIG. 2, a battery housing 16 includes a bottom side or underside 44 and a housing portion or battery cover 22 on the rear or backside. The housing 16 and housing portion 22 can either be one integrated housing or two separate housings coupled together. Preferably, for attaching the two separate parts, battery cover 22 and battery housing 16 are ultrasonically welded together once battery cells 71-76, shown in FIG. 3, have been placed inside.

Both the battery cover 22 and the bottom side 44 of the battery include mating mechanisms, such as protrusions or bosses 13 and 36, respectively, for attaching the battery to the radio 30. The bottom protrusions 36 captivate charging contacts such as positive and negative charger contacts 18 and 21 and sensor contacts 19 and 20 on the bottom side 44 of the battery pack 10. Likewise, on the rear or backside of the battery pack 10, the top protrusion 13 captivates the positive and negative supply contacts 28 and 26, respectively, within the top rear protrusion 13 disposed on the housing portion or battery cover 22.

Each of the pair of bottom protrusions 36 hooks into each of the apertures 64, in the corresponding end of the radio housing 32 to provide pivotal support. Similarly, the top rear protrusion 13 extends into the cavity 66, in the corresponding top portion of the radio housing 32, to provide proper alignment and to reduce tolerance stack-up during attachment. When the lower end of the battery is inserted into the radio, the battery pack 10 hooks or pivots at one end as the lower protrusions 36 are engaged by the apertures 64. Preferably, the protrusions 36 do not extend out of the apertures 64 but recessed within them. Then, the protrusion 13 in the battery cover is pivoted into proper alignment by being lowered towards the radio housing until the protrusion 13 aligns into place. Thus, the protrusion 13 and cavity 66, mated at the opposite portion, complete the alignment process, started when the battery and radio were pivotally attached at the other end. Dual pivotal supports are used to balance the alignment better. However, it is possible to implement the invention with only one pivotal support in accordance with the invention.

The protrusions 36 and 13 preferably carry cylindrical conductive contacts. These contacts are force-fitted into molded through-holes 1 1 2 and 114 of the battery housing 16 to integrally form the positive and negative charger contacts 21 and 18, charger sense contacts 19 and 20, and positive and negative battery supply contacts 28 and 26 in the housing.

Referring to FIG. 3, one end of the cylindrical contacts provide the positive and negative supply contact surfaces to match and electronically couple to the radio supply contacts. Within the battery housing 16, the other end of the cylindrical contacts 18-21 are reflowed onto a flexible circuit 80. For simplicity, only the flexible circuitry 80, including the dashed negative path, coupled to the positive 84 and negative 82 terminals of a cell or a series of cells 71-76 and to the positive and negative charger (21 and 18) and battery supply contacts (28 and 26) is shown.

Note that isolated supply contacts and isolated charger contacts do not exist because they have been incorporated into the protrusions 13 and 36, thus providing savings in tooling and parts in the manufacture of this battery for portable products. Contact captivated protrusions 13 and 36 serve as the mechanical mating means and the electronic coupling means of the battery to one or more electronic product. In one case, the electronic product is a portable two-way radio. Contact captivated protrusion 13 mechanical mates and aligns and electronically couples the battery to the radio.

In another case, the electronic product is a charger. Contact captivated protrusions 36 mechanically mates and aligns the battery cover 22 to the battery housing 16 and electronically couples the battery to the charger. The apertures 64 enable access to the battery electronics through the retaining area 44 of the battery housing. This efficient integration of the retention feature and charger contact achieves a smaller radio foot-print because fewer parts are used. The contact within the protrusion further reinforces and strengthens the protrusion. Charger and sense contacts 18-21, normally seen on the backside of the battery housing are now only visible on the bottom of the radio, to create a flush undisturbed look on the back of the battery housing. Furthermore, the cylindrical contacts are protected from damage because they are surrounded both by the plastic battery housing and the plastic radio housing when the battery is attached to the radio.

What is claimed is:

1. A battery for attachment to and powering of a radio, the battery comprising:
   at least one cell;
   a housing containing said at least one cell;
   mating means, located on the housing, for selectively attaching the battery and the radio, the mating means including a pair of protrusions selectively receivable by the radio; and
   charging contacts located on at least one of the protrusions.

2. The battery of claim 1, wherein the charging contacts comprises:
   a positive charging contact and a negative charging contact located on one protrusion of the pair; and
   a pair of sensing contacts located on the other protrusion of the pair.

3. The battery of claim 1, wherein the mating means includes a latch.

4. A radio having an integrated mechanical and electrical mating system, comprising:
   a battery having at least one cell having a terminal;
   a housing for housing the battery;
   conductive protrusion means formed on the housing for electrically coupling the battery to a charger; and
   protrusion receiving means on the radio for receiving the conductive protrusion means, for mechanically coupling the battery to the radio, and for electrically coupling the battery to the charger.

5. The radio of claim 4, wherein the conductive protrusion means formed on said housing comprises molded-in circuitry coupled to the terminal.

* * * * *